(12) United States Patent
Bekara

(10) Patent No.: US 12,196,905 B2
(45) Date of Patent: Jan. 14, 2025

(54) MACHINE LEARNING TECHNIQUES FOR NOISE ATTENUATION IN GEOPHYSICAL SURVEYS

(71) Applicant: PGS Geophysical AS, Olso (NO)

(72) Inventor: Maiza Bekara, Kingston Upon Thames (GB)

(73) Assignee: PGS Geophysical AS, Oslo (NO)

( * ) Notice: Subject to any disclaimer, the term of this patent is extended or adjusted under 35 U.S.C. 154(b) by 467 days.

(21) Appl. No.: 17/489,518

(22) Filed: Sep. 29, 2021

(65) Prior Publication Data

US 2022/0018984 A1 Jan. 20, 2022

Related U.S. Application Data

(62) Division of application No. 16/436,211, filed on Jun. 10, 2019, now abandoned.

(60) Provisional application No. 62/776,854, filed on Dec. 7, 2018, provisional application No. 62/687,506, filed on Jun. 20, 2018.

(51) Int. Cl.
*G01V 1/36* (2006.01)
*G06N 3/08* (2023.01)
*G06N 20/10* (2019.01)

(52) U.S. Cl.
CPC .............. *G01V 1/366* (2013.01); *G06N 3/08* (2013.01); *G06N 20/10* (2019.01); *G01V 2210/324* (2013.01)

(58) Field of Classification Search
CPC ................................ G01V 1/366; G06N 20/10
See application file for complete search history.

(56) References Cited

U.S. PATENT DOCUMENTS

| | | | |
|---|---|---|---|
| 6,651,007 B2 | 11/2003 | Ozbeck | |
| 11,169,288 B1* | 11/2021 | Johnson | G06N 20/10 |
| 2010/0149917 A1 | 6/2010 | Imhof et al. | |
| 2012/0008458 A1 | 1/2012 | Moldoveanu | |
| 2018/0171769 A1* | 6/2018 | Gu | E21B 43/267 |
| 2019/0034812 A1* | 1/2019 | Borrel | G01V 99/005 |
| 2019/0219716 A1* | 7/2019 | O'Toole | G01V 1/288 |

(Continued)

FOREIGN PATENT DOCUMENTS

WO 2018148492 8/2018

OTHER PUBLICATIONS

Spanos, et al., "Using Statistical Techniques to Improve the QC Process of Swell Noise Filtering," 75th EAGE Conference & Exhibition (EAGE, Jun. 2013).

(Continued)

*Primary Examiner* — Ricky Go

(57) ABSTRACT

Techniques are disclosed relating to machine learning in the context of noise filters for sensor data, e.g., as produced by geophysical surveys. In some embodiments, one or more filters are applied to sensor data, such a harsh filter determined to cause a threshold level of distortion in measured reflections, a mild filter determined to leave a threshold level of remaining noise signals, or an acceptable filter. In some embodiments, the system trains a machine learning classifier based on outputs of the filtering procedures and uses the classifier to determine whether other filtered sensor data from the same survey exhibits acceptable filtering. This may improve accuracy or performance in detecting unacceptable filtering, in some embodiments.

25 Claims, 7 Drawing Sheets

(56) References Cited

U.S. PATENT DOCUMENTS

2019/0383965 A1    12/2019  Salman et al.
2020/0064507 A1*    2/2020  Mao .......................... G01V 1/28
2020/0347700 A1*   11/2020  Yu ............................ G01V 1/48

OTHER PUBLICATIONS

Martin, et al., "Using Machine Learning to Produce a Global Automated Quantitative QC for Noise Attenuation," SEG Technical Program Expanded Abstracts (SEG, Aug. 19, 2015).
Bekara, "Automatic Quality Control of De-Noise Processes Using Support-Vector Machine Classifier," 81st Annual EAGE Conference & Exhibition (Jun. 3-6, 2019) 5 page article with 35 page slide set.

\* cited by examiner

MACHINE LEARNING TECHNIQUES FOR NOISE ATTENUATION IN GEOPHYSICAL SURVEYS

CROSS-REFERENCE TO RELATED APPLICATIONS

This application is a Divisional of application Ser. No. 16/436,211, filed Jun. 10, 2019, which claims the benefit of U.S. Provisional Application No. 62/687,506, filed on Jun. 20, 2018, and of U.S. Provisional Application No. 62/776,854, filed on Dec. 7, 2018. Each of those three applications is hereby incorporated by reference as if entirely set forth herein.

BACKGROUND

Geophysical surveys are often used for oil and gas exploration in geological formations, which may be located below marine environments. Seismic surveys, for example, are based on the use of acoustic waves. In seismic surveys, a survey vessel may tow one or more signal sources (e.g., an air gun) and a plurality of streamers along which a number of acoustic sensors (e.g., hydrophones and/or geophones) are located. Acoustic waves generated by the source(s) are transmitted into the earth's crust and then reflected back and captured at the sensors. Data collected during a marine geophysical survey is analyzed to locate hydrocarbon-bearing geological formations, and thus determine where deposits of oil and natural gas may be located.

Typically, sensor data from a geophysical survey exhibits noise. It may be desirable to filter this noise in order to distinguish the desired signals (signals originating from the survey sources that are reflected and measured by sensors). Examples of noise include ambient vibrations, ocean currents, shipping noise, noise from ocean lifeforms, etc. Sometimes, noise filtration may be performed during a survey (e.g., on-board a survey vessel). Traditionally, filtration quality has been checked manually, e.g., to detect if filtration is too mild (leaving substantial noise in the signal) or too harsh (causing distortions in the desired signals).

DETAILED DESCRIPTION

Example Survey System

Figure 1:
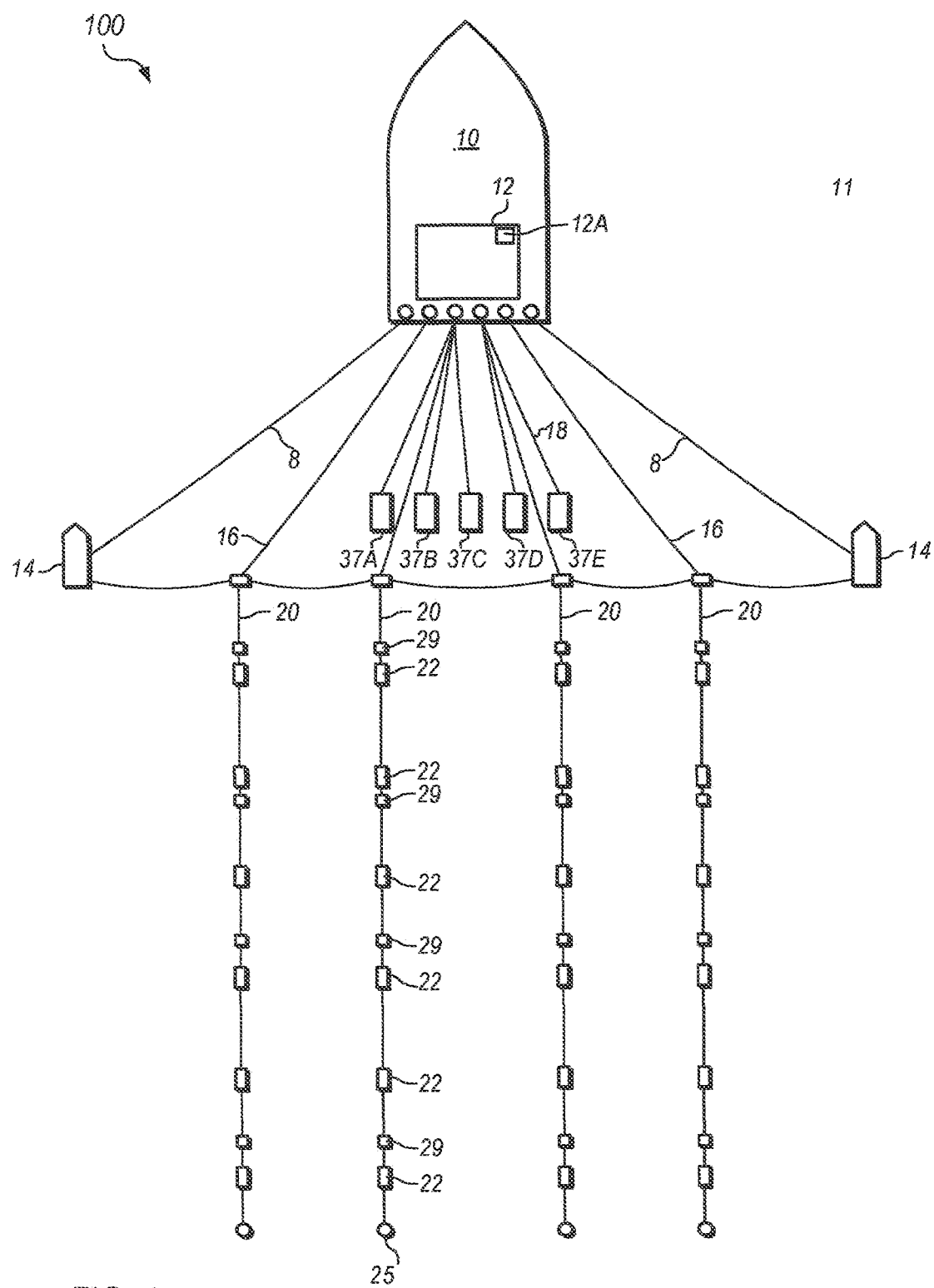
FIG. 1 is a block diagram illustrating an example geophysical survey system, according to some embodiments.

FIG. 1 is a block diagram illustrating a geophysical survey system 100, according to some embodiments. In various embodiments, survey system 100 is configured to acquire geophysical data corresponding to geological structures disposed below body of water 11. In the illustrated embodiment, system 100 includes survey vessel 10, which tows signal sources 37, streamers 20, and paravanes 14. In other embodiments, at least a portion of streamers 20 may be towed by a second survey vessel (not shown), in place of or in addition to survey vessel 10. Similarly, in some embodiments, at least a portion of signal sources 37 may be towed by one or more additional survey vessels (not shown), in place of or in addition to survey vessel 10.

In survey system 100, survey vessel 10 is shown towing five signal sources 37A-37E (referred to collectively as "sources 37" or "signal sources 37") using source cables 18. Note that, in some embodiments, sources may be towed in various patterns (e.g., square or circular patches) using various cable configurations for multi-dimensional data acquisition. In various embodiments, survey vessel 10 may tow any appropriate number of signal sources, including as few as none (e.g., when sources are towed by another vessel) or as many as six or more. In some embodiments, one or more of sources 37 may be impulsive sources such as air guns. In some embodiments, one or more of signal sources 37 may be vibratory signal sources that may be configured to be driven according to a given function by control equipment 12. For example, in various embodiments, one or more of signal sources 37 may be vibratory signal sources configured to be driven according to a given function or digital code.

Survey vessel 10 includes equipment, shown generally at 12 and, for convenience, collectively referred to as "control equipment." Control equipment 12 may include devices such as a data recording unit (not shown separately) for making a record of signals generated by various geophysical sensors 22 in the system 100. Control equipment 12 may also include navigation equipment (not shown separately), which may be configured to control, determine, and record, at selected times, the geodetic positions of: survey vessel 10, each of a plurality of geophysical sensors 22 disposed at locations on streamers 20, and signal sources 37. Geodetic position may be determined using various devices, including global navigation satellite systems such as the global positioning system (GPS), for example. In the illustrated embodiment, survey vessel 10 includes geodetic positioning device 12A. Additional positioning devices may be placed at various locations on streamers 20. In some embodiments, control equipment 12 is configured to control sources 37, e.g., to control when the sources 37 activate, where the sources 37 are positioned, the manner in which the sources 37 are activated, etc. Note that, although control equipment 12 is shown on survey vessel 10, this embodiment is provided merely as an example and is not intended to limit the scope of the present disclosure. In various embodiments, components of control equipment 12, or the entirety of control equipment 12, may alternatively be located on a separate vessel (not shown) or at a remote location as desired.

Control equipment 12, in various embodiments, includes a computing system (an example embodiment of which is discussed below with reference to FIG. 7) configured to, inter alia, process sensor outputs from geophysical sensors 22. In other embodiments, a computing system at another location may process geophysical data gathered by geophysical survey system 100 (e.g., on land after a survey has been conducted). A computing system may include or be configured to access a non-transitory, computer-readable storage medium having instructions stored thereon that are executable to perform various operations described herein in order to conduct a survey or process sensor outputs generated during a survey. A computing system may include one or more processors configured to execute the program instructions to cause a system to perform various functionality described herein.

In FIG. 1, survey vessel 10 tows four streamers 20 using lead-in cables 16. In various embodiments, however, survey vessel 10 may tow any appropriate number of streamers, including as few as none (e.g., when streamers are towed by another vessel) or as many as 26 or more. Streamers 20 of FIG. 1 include geophysical sensors 22. Geophysical sensors 22 on streamers 20 may be any of various types of geophysical sensor. Examples include hydrophones and/or geophones in some embodiments. Non-limiting examples of such geophysical sensors may include particle motion responsive seismic sensors such as geophones and accelerometers, pressure responsive seismic sensors such as hydrophones, pressure-time-gradient responsive seismic sensors, electrodes, magnetometers, temperature sensors, or any suitable combination of the foregoing. In various implementations of the disclosure, geophysical sensors 22 may measure, for example, seismic field energy indicative of the response of various structures in the Earth's subsurface formation below the bottom of body of water 11 to energy imparted into the subsurface formation by one or more of signal sources 37. Seismic energy, for example, may originate from signal sources 37 deployed in body of water 11 and towed by survey vessel 10.

In various embodiments, streamers 20 may include any of various appropriate modules in addition to geophysical sensors 22. In geophysical survey systems that include a plurality of laterally spaced-apart streamers, such as system 100, streamers 20 are typically coupled to towing equipment that secures the forward end of each of streamers 20 at a selected lateral position with respect to adjacent streamers and with respect to survey vessel 10. For example, as shown in FIG. 1, the towing equipment may include two paravanes 14 coupled to survey vessel 10 via paravane tow ropes 8. In the illustrated embodiment, paravanes 14 are the outermost components in the streamer spread and may be used to provide lateral streamer separation. In some embodiments, survey vessel 10 may be configured to tow different streamers 20 at different depths and/or different lateral displacements from a centerline of survey vessel 10. In FIG. 1, streamers 20 further include birds 29, which are steering devices configured to maintain streamers 20 in a desired position (e.g., at a specified depth and/or lateral displacement). Similarly, steering devices may be used to facilitate positioning of sources 37. In some embodiments, survey vessel 10 may be configured to tow streamers 20 using various geometries such as different feather angles, depth profiles, etc. In some embodiments, streamers 20 may include multiple geodetic positioning devices (not shown). In some embodiments, streamers 20 include tail buoys 25.

Overview of Noise Attenuation and Quality Control (QC)

Seismic imaging of the sub-surface is very important for hydrocarbon prospection. The acquired seismic data typically flows through a complex chain of compute-intensive processing stages in order to produce the final image of the sub-surface geology.

One particular stage in this processing chain is the attenuation of noise. "Noise," in this context, refers to any seismic energy that does not represent a reflection of signals (originating from a survey source) from a geological layer. Sources of noise are both environmental and man-made. Noise degrades the quality of the sub-surface image and renders interpretation of the geological layers less accurate. Hence, it is important to remove noise, but this needs to be done in a controlled way in order not to attenuate the desired signal.

Quality control (QC) assessment is often performed at each noise attenuation step to ensure that key seismic image properties such as bandwidth, resolution, and signal to noise ratio (SNR) are not compromised. The QC step traditionally requires a good deal of human interaction and represents a considerable part of the project's time line. With the continuous increases in the volume of the acquired seismic data, automating at least a portion of the QC step may be desirable to reduce QC time. In disclosed embodiments, automation is performed using machine learning, where a machine learning classifier is trained based on a sub-set of the data and is then used to generalize QC decisions on a larger dataset. Example techniques for training and using such a machine learning classifier are discussed in detail below with reference to FIG. 2.

Example Machine Learning Training Techniques

In various embodiments, sensor measurements may be filtered to remove noise. Filtering parameters may be determined for a survey using a subset of the survey data and filter outputs may be monitored to determine whether filtering meets one or more quality control criteria.

Figure 2:
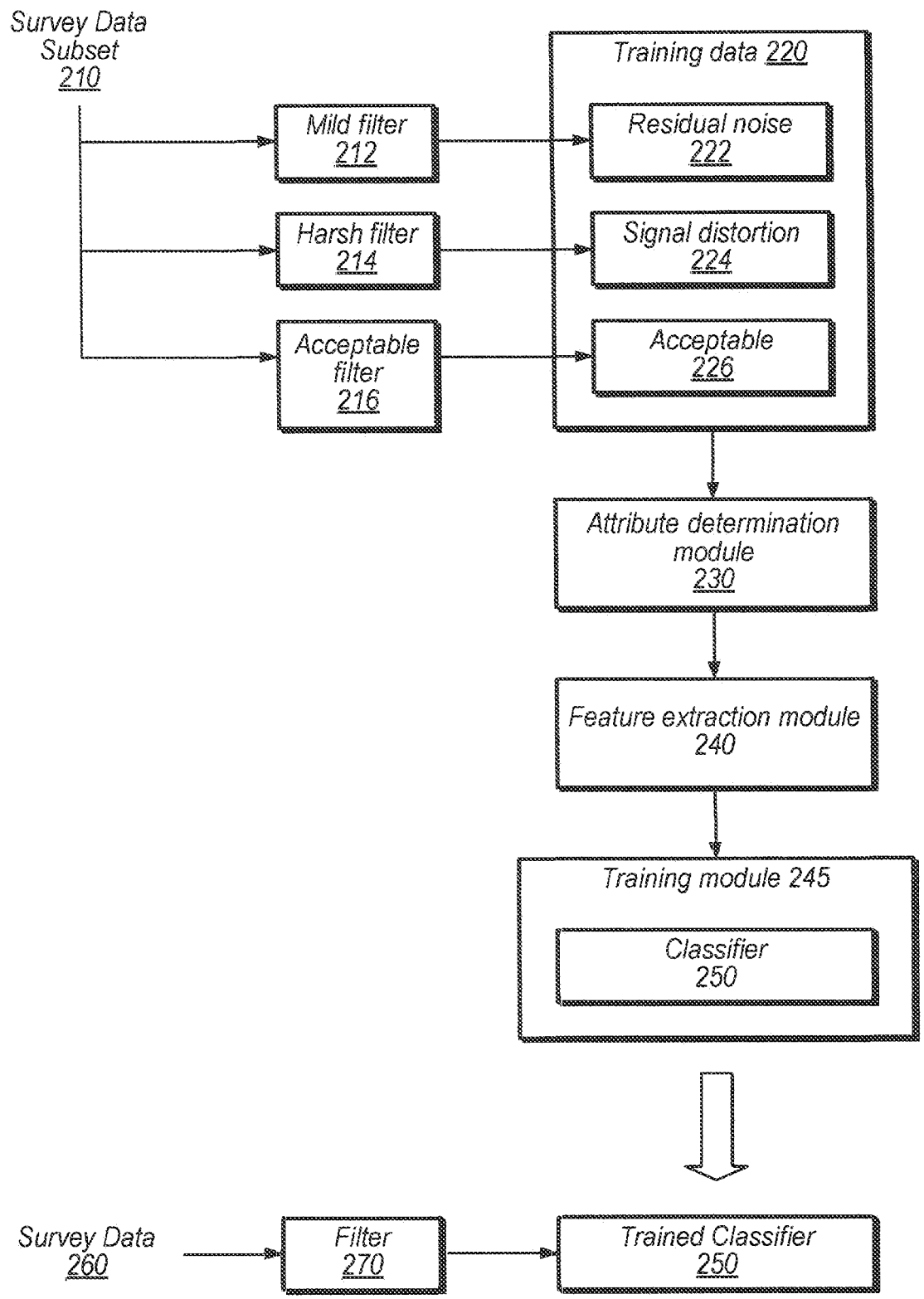
FIG. 2 is a block diagram illustrating an example system configured to train a classifier to categorize filtering of sensor measurements for a particular survey, according to some embodiments.

FIG. 2 is a block diagram illustrating example training techniques for a machine learning classifier to classify filter outputs, according to some embodiments. Speaking generally, in some embodiments multiple types of filtering are applied to a subset of survey data. The outputs of these filters are then used to train a classifier to automatically perform quality control of filtering for other survey data. Filters with certain properties (e.g., harsh, acceptable, or mild filtering) may be user-identified or may be identified automatically by the computing system. Note that a harsh filter may cause distortions in the desired signal while a mild filter may leave noise signals after filtering.

For example, in the illustrated embodiment, the system processes survey data subset 210 using mild filter 212, harsh filter 214, and acceptable filter 216. In some embodiments, a geophysicist may examine initial filter results for subset 210 to identify mild and harsh filters. The geophysicist (or an automated module) may adjust filter parameters or apply a number of filtering procedures to ensure that both harsh and mild filtering occurs for subset 210 (or more generally, to ensure that filtering occurs that does not visually pass quality control requirements, for use in training). In some embodiments, examples of harsh, mild, and acceptable filtering are determined during a parameter testing phase of the filtering process. Non-limiting examples of filters that may be utilized, with various input parameters, include: Singular spectrum analysis (SSA), reduced-rank filtering, prediction error filtering, time-frequency peak filtering (TFPF), wavelet analysis, independent component analysis (ICA), etc. In various embodiments, one or more of these filtering techniques correspond to various means for applying a filtering procedure to sensor data.

The outputs of the filters are stored as training data 220, in the illustrated embodiment, which includes data with residual noise 222 due to mild filtering, data with signal distortion 224 due to harsh filtering, and acceptable data 226.

Attribute determination module 230, in the illustrated embodiment, determines attributes for the training data. In some embodiments, attribute values are determined for each ensemble of data (e.g., group of traces) such as each shot point, e.g., for embodiments with impulsive sources such as airguns. In embodiments with other types of sources such as vibratory sources, attributes may be determined for each ensemble of data such as receiver-gather, shot-gather, or any other collection of seismic traces on which the filtering or the QC is to be performed. In some instances, filtering is performed within a given ensemble of data (e.g. common depth point (CDP)), but the attribute computation for the purpose of automatic QC is performed on a different ensemble of data (e.g., SHOT). Examples of techniques for determining attributes are discussed in further detail below and include, for example, cross-correlation, mutual information, mean lambda, and rank correlation.

Figure 3:
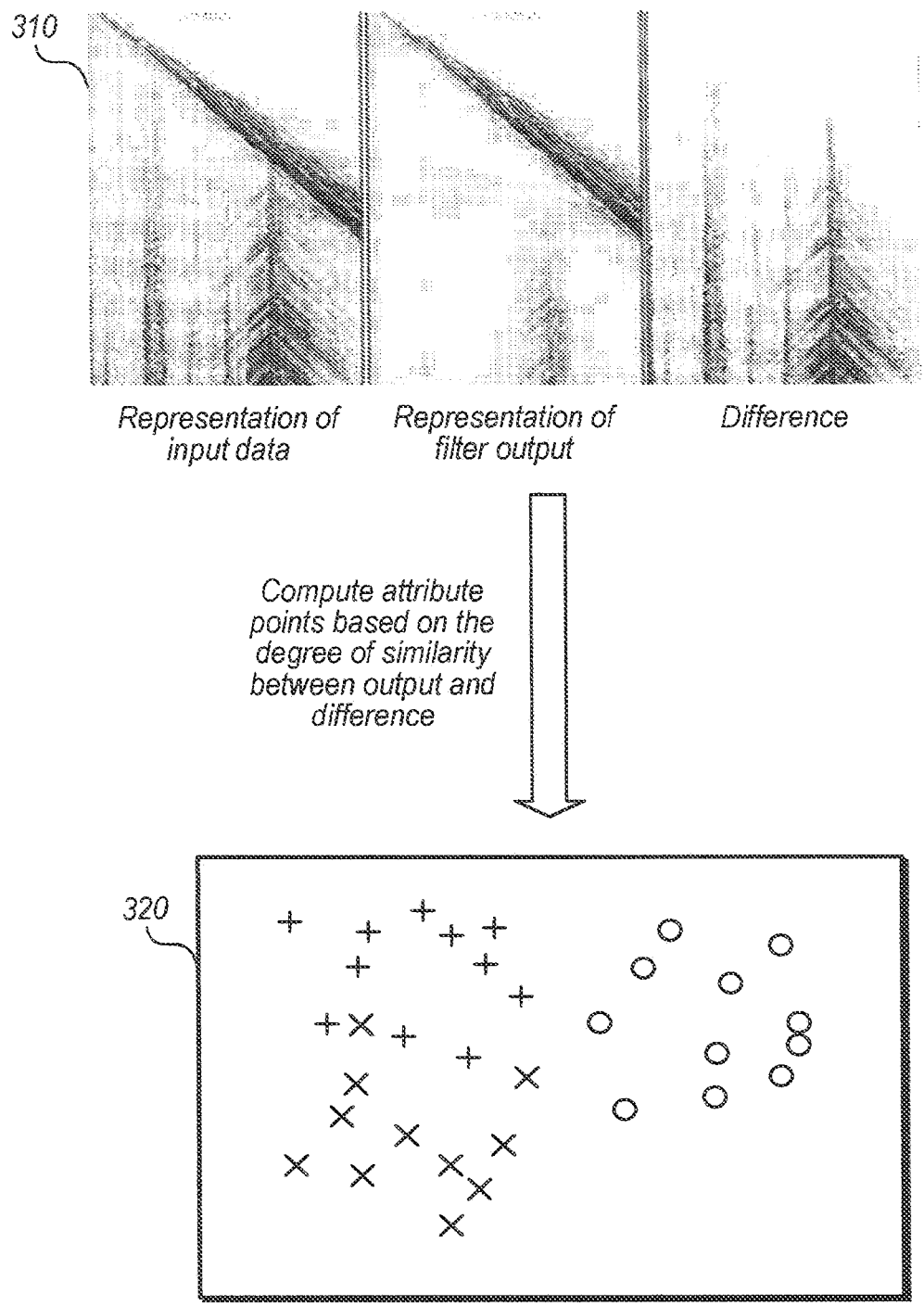
FIG. 3 is a diagram illustrating example attributes determined based on degree of similarity between filtering outputs and the difference between filter input and filter output, according to some embodiments.

In various embodiments, attribute determination module 230 is configured to compute attribute points for each ensemble of data based on degree of similarity between filter outputs and the residual, which is the difference between input data and the filter output. For example, referring briefly to FIG. 3, a visualization 310 of sensor data is shown. The left-hand portion of visualization 310 represents the input sensor data, the center portion represents the output of filtering the input data, and the right-hand portion represents the difference between the two. Speaking generally, the similarity between the output (center portion) and the difference (right-hand portion) is greater when there is signal distortion or residual noise. In some embodiments, the level of similarity is quantified by determining one or more empirical correlation statistics based on seismic samples of the output and the residual within a target window chosen for each ensemble. Additional details for such similarity statistics are discussed in detail below. As shown in FIG. 3, the degree of similarity between the output and difference may be used to generate a plot 320 of attributes in multi-dimensional attribute space. Note that the visualization 310 is for one shot gather to which filtering has been applied, which will contribute a single point to plot 320. In the illustrated example, the "+" points are from acceptable filtering, the "X" points are from mild filtering, and the circle points are from harsh filtering. A two-dimensional attribute space is shown for purposes of illustration, but spaces having various numbers of dimensions may be used. Generally, the N dimensions of the space may correspond to N attributes.

In some embodiments, because neighboring seismic ensembles (such as successive shot gathers) will likely have the same classification, the attribute vector for each ensemble may be augmented with attributes of neighboring ensembles (and the number of neighboring ensembles considered for this procedure may be user-adjustable). The new vector of attributes may be referred to as an augmented attribute vector.

Figure 4:
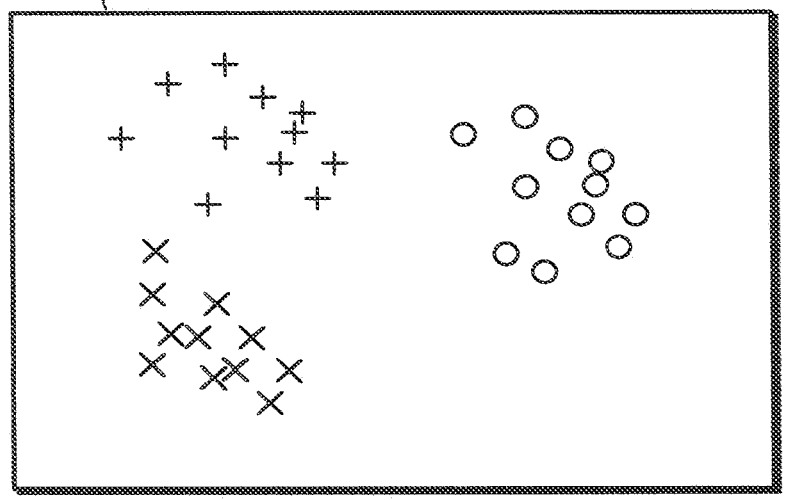
FIG. 4 is a diagram illustrating outputs of feature extraction based on determined attributes, according to some embodiments.

Referring again to FIG. 2, feature extraction module 240, in some embodiments, is configured to extract features based on the determined attributes. Attributes from the different types of filtering applied to produce the training dataset may be used to derive the mapping of a vector of attributes (which may be an augmented attribute vector) to a vector of features. In some embodiments, this may generate points in a feature space, which may have a smaller number of dimensions than the attribute space. Feature extraction is a well-understood technique that may remove correlation between initial attribute variables to increase discrimination power. Non-limiting examples of feature extraction techniques include principle component analysis (PCA) and independent component analysis (ICA). Referring briefly to FIG. 4, an example plot of feature extraction results 410 is shown, based on the attribute points of FIG. 3.

Figure 5A:
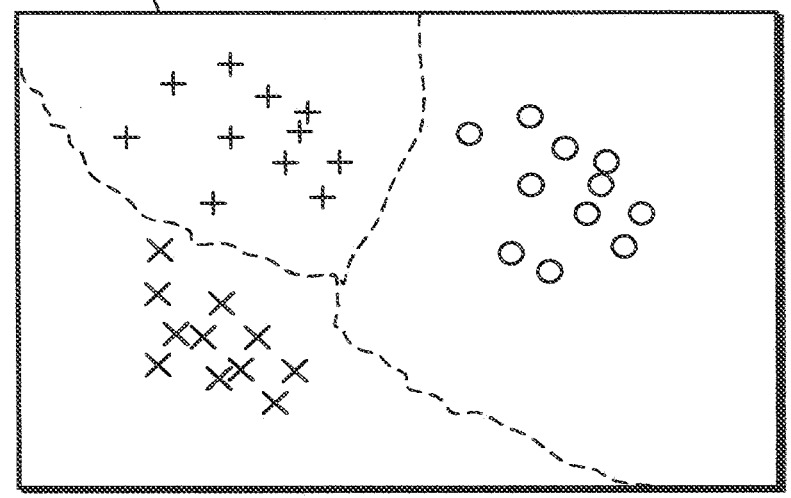
FIGS. 5A and 5B are diagrams illustrating an example decision space determined based on the feature extraction and use thereof, according to some embodiments.

Training module 245 uses the feature extraction results to train classifier 250, in some embodiments. For example, referring briefly to FIG. 5A, the training system may configure classifier 250 with decision spaces based on the feature extraction. One or more of various supervised classification techniques may be used alone or in combination, such as multi-layer neural networks, convolutional neural networks, support vector machines (SVM), random forest analysis, boosted trees, linear classifiers, etc. FIG. 5A shows a plot 510 with decision spaces that are determined based on the feature extraction. In some embodiments, the supervised classifier partitions the feature space into regions associated with the different types of filtering. In the illustrated example, points that fall in the lower-left hand portion of the plot may be classified as having mild filtering, points that fall in the right-hand portion may be classified as having harsh filtering, and points that fall in the upper-left hand portion may be classified as having acceptable filtering. Thus, trained classifier 250 may be used to check quality control of filter 270 for remaining survey data 260. In some embodiments, survey data subset 210 is a subset of data 260.

Figure 5B:
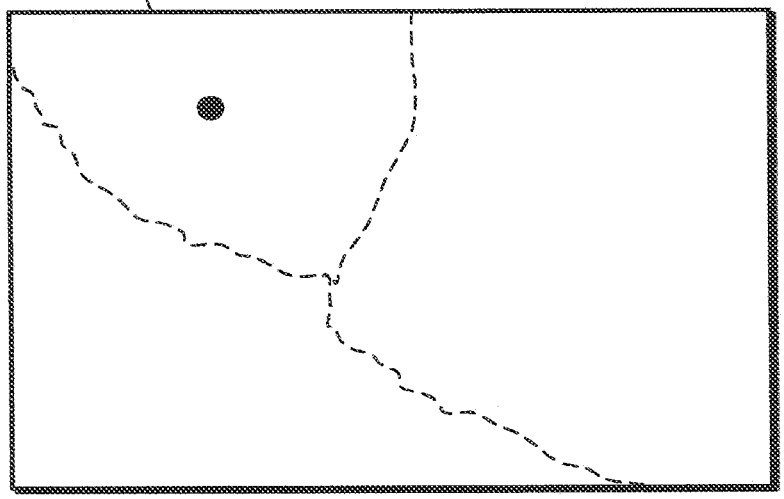

In some embodiments, to determine the classification of a new ensemble of seismic data that was not used in building the classification system, first its corresponding vector of attributes is computed, then the vector of features is obtained using the already derived feature mapping. The vector of features is determined in the feature space (e.g., as plotted in FIG. 5B) and the classification of the filter is derived based on which part of the feature space the vector of feature falls in. In the example of FIG. 5B, the illustrated point exhibits acceptable filtering.

In various embodiments, training a classifier on a per-survey or per-survey-portion basis may improve automatic quality control, given that desirable filtering parameters may vary between surveys and/or survey portions.

Note that although attribute determination, feature extraction, and decision spaces are discussed herein for purposes of illustration, these techniques are not intended to limit the scope of the present disclosure. In other embodiments, any of various training techniques may be implemented to train a machine learning classifier based on different sets of training data with different filtering characteristics. Further, although the example techniques discussed herein train a classifier using harsh, mild, and acceptable sets of training data, in other embodiments, the disclosed techniques may use larger or smaller numbers of classifications. For example, the classifier may be trained to differentiate between harsh and acceptable filtering only or between mild and acceptable filtering only. As another example, the classifier may be trained to differentiate four or more classes (e.g., with multiple classes of acceptable filtering, mild filtering, and/or harsh filtering to indicate severity of filtering problems, which may inform filter parameter adjustment).

In various embodiments, the operations performed by elements 212, 214, 216, 230, 240, and 250 of FIG. 2 taken alone, in combination, or in combination with operations different from those illustrated in FIG. 2, correspond to various means for training a classification engine based on outputs of the different filtering procedures. Similarly, the operations performed by trained classifier 250 taken alone, in combination with other operations discussed with reference to FIG. 2, or in combination with operations different from those illustrated in FIG. 2, correspond to various means for classifying, using a trained classification engine, other filtered sensor data from the geophysical survey to determine whether the other filtered sensor data exhibits acceptable filtering.

In various embodiments, the disclosed techniques may advantageously improve accuracy in detecting undesirable filtering of a set of survey data, relative to traditional manual techniques. The disclosed techniques may also improve performance, reducing time required for quality control procedures. In some embodiments, the disclosed techniques may provide a new way to perform quality control that was previously performed manually by geophysicists. In some embodiments, the disclosed techniques may be performed on-board a survey vessel that tows sources or sensors for the survey, which may be difficult using traditional techniques. Speaking generally, the disclosed techniques are directed to improvements in the technical field of quality control for filtering of sensor data, which may be particularly relevant in geophysical surveying.

Example Techniques for Generating Attributes

The following discussion provides examples for determining attributes based on filter output and a difference between the filter output and the input data, according to some embodiments. In some embodiments and situations, these attributes can be very informative for distinguishing between different types of filtering. These examples are not intended to limit the scope of the present disclosure. Any of various other attributes may be used in addition to or in place of the disclosed attributes. In some embodiments, various attributes may be used in combination to generate points in an attribute space (e.g., an N-dimensional space when generating N attributes).

A first example technique for generating an attribute is cross correlation, e.g., Pearson's cross correlation. This may utilize the following equation, for example, in which $x_i$ represents the output seismic samples after filtering, $d_i$ represents the difference seismic samples, and N is the number of samples:

$$\rho_{xy} = \frac{\sum_{i=1}^{N}(x_i - \bar{x})(d_i - \bar{d})}{\sqrt{\sum_{i=1}^{N}(x_i - \bar{x})^2 \sum_{i=1}^{N}(d_i - \bar{d})^2}}$$

$$\text{where } \bar{x} = \frac{1}{N}\sum_{i=1}^{N} x_i \text{ and } \bar{d} = \frac{1}{N}\sum_{i=1}^{N} d_i$$

A second example technique for generating an attribute is determining mean lambda. This technique may utilize the following equation, for example, in which $y_i$ represents the input to the filter and x and d represent output samples and difference samples as described above:

$$\bar{\lambda} = \sum_{i=1}^{N}\left(\frac{y_i^2}{x_i^2 + d_i^2}\right)$$

A third example technique for generating an attribute is a mutual information function, e.g., as defined by the following equation:

$$I(X, D) = \sum\sum p(x, d)\log\left(\frac{p(x, d)}{p(x)p(d)}\right)$$

in which p(x,d) is a joint probability density function of the seismic samples of the output (x) and the difference (d) and p(x) and p(d) are, respectively, the individual probability density functions for the seismic samples of the output and for the difference. Empirical estimation of PDF is a well-known topic in statistical analysis.

A fourth example technique for generating an attribute is correlation, e.g., rank correlation such as Kendall rank correlation or Markov rank correlation. Kendall rank correlation may utilize the following procedure. Draw randomly two samples for X and D: $(x_i,d_i)$ and $(x_j,d_j)$. Set $a_1$=sign($x_i$−$x_j$) and $a_2$=sign($d_i$−$d_j$). If ($a_1$==$a_2$), then the pairs are concordant. If not, then the pairs are discordant. After processing a number of pairs, the Kendall rank correlation is:

$$\frac{\text{Number of concordant pairs} - \text{number of discordant pairs}}{\text{Total number of pairs}}$$

Markov rank correlation may utilize the following procedure. Draw randomly one sample for X and D: $(x_i,d_i)$. Set $a_1$=sign($x_i$−$x_{(i-L)}$) and $a_2$=sign($d_i$−$d_{(i-t)}$), where L is an integer that indicates the distance between neighboring samples. If ($a_1$==$a_2$), then the pairs are concordant. If not, then the pairs are discordant. In some embodiments, a relatively large number of random pair drawings are used for Kendall and Markov correlation to produce reliable statistics. After processing a number of pairs, the Markov rank correlation is:

$$\frac{\text{Number of concordant pairs} - \text{number of discordant pairs}}{\text{Total number of pairs}}$$

Example Method

Figure 6:
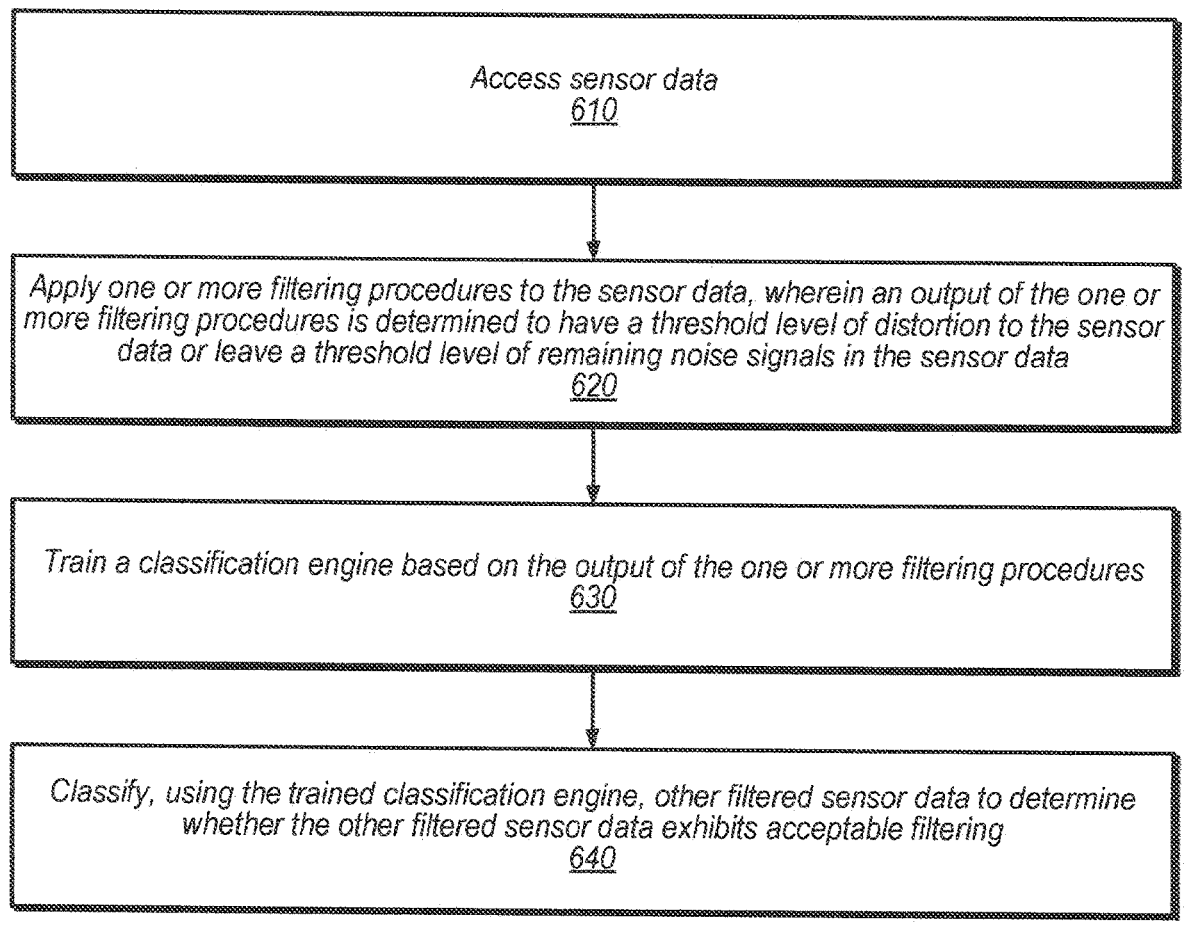
FIG. 6 is a flow diagram illustrating an example method for machine learning classification of filtering for geophysical survey data, according to some embodiments.

Turning now to FIG. 6, a flow diagram illustrating an example method for classifying filtering of sensor data, according to some embodiments. In some embodiments, control equipment 12 of survey vessel 10 or computing equipment on-shore is configured to perform, or to cause to be performed, the operations described with reference to FIG. 6. Further, in some embodiments, control equipment 12 may include (or have access to) a non-transitory, computer-readable medium having instructions stored thereon that are executable by the control equipment 12 to cause the control equipment 12 to perform, or to cause to be performed, the operations described with reference to FIG. 6. While the elements of FIG. 6 are shown in a particular order for ease of understanding, other orders may be used. In various embodiments, some of the method elements may be performed concurrently, in a different order than shown, or may be omitted. Additional method elements may also be performed.

At 610, in the illustrated embodiment, a computing system accesses sensor data. The sensor data may be obtained by a geophysical survey, for example, where the sensor data is based on sensor measurements of subsurface reflections of signals emitted by one or more survey sources (e.g., seismic sources, electromagnetic sources, etc.). The accessing may include reading from one or more computer-readable media to access sensor data recorded by survey sensors. In various embodiments, element 610 alone, in combination with the other operations of FIG. 6, or in combination with operations different from those illustrated in FIG. 6, corresponds to various means for accessing sensor data.

At 620, in the illustrated embodiment, a one or more filtering procedures are applied to the sensor data, an output of the one or more filtering procedures is determined to have a threshold level of distortion to the sensor data (e.g., due to a harsh filter) or leave a threshold level of remaining noise signals in the sensor data (e.g., due to a mild filter). Note that the harsh and mild filtering procedures may implement the same type of filter (e.g., with different input parameters) or may implement different types of filters.

At 630, in the illustrated embodiment, the computing system trains a classification engine based on outputs of the first and second filtering procedures. Generally, the training may be based on various combinations of training data, such as harsh/normal, mild/normal, harsh/mild/normal, very harsh/harsh/normal, etc. As discussed above, the classification engine may implement various machine learning techniques, alone or in combination (e.g., using model stacking).

The training may include generating respective sets of attributes in an attribute space for the one or more filtering procedures. This may be determined based on similarity between: outputs of the one or more filtering procedures and differences between the outputs of the one or more filtering procedures and the sensor data. The training may include performing feature extraction to generate respective sets of features for the one or more filtering procedures in a feature space.

At 640, in the illustrated embodiment, the computing system classifies, using the trained classification engine, other filtered sensor data to determine whether the other filtered sensor data exhibits acceptable filtering. In some embodiments, sensor data that exhibits acceptable filtering is stored on a non-transitory computer-readable medium, thereby completing the manufacture of a geophysical data product. The training and classifying of elements 630 and 640 may be performed during the same geophysical survey. The classification may generate attributes and features for the other sensor data and determine which portions of the feature space correspond to the generated features.

Example Computing Device

Figure 7:
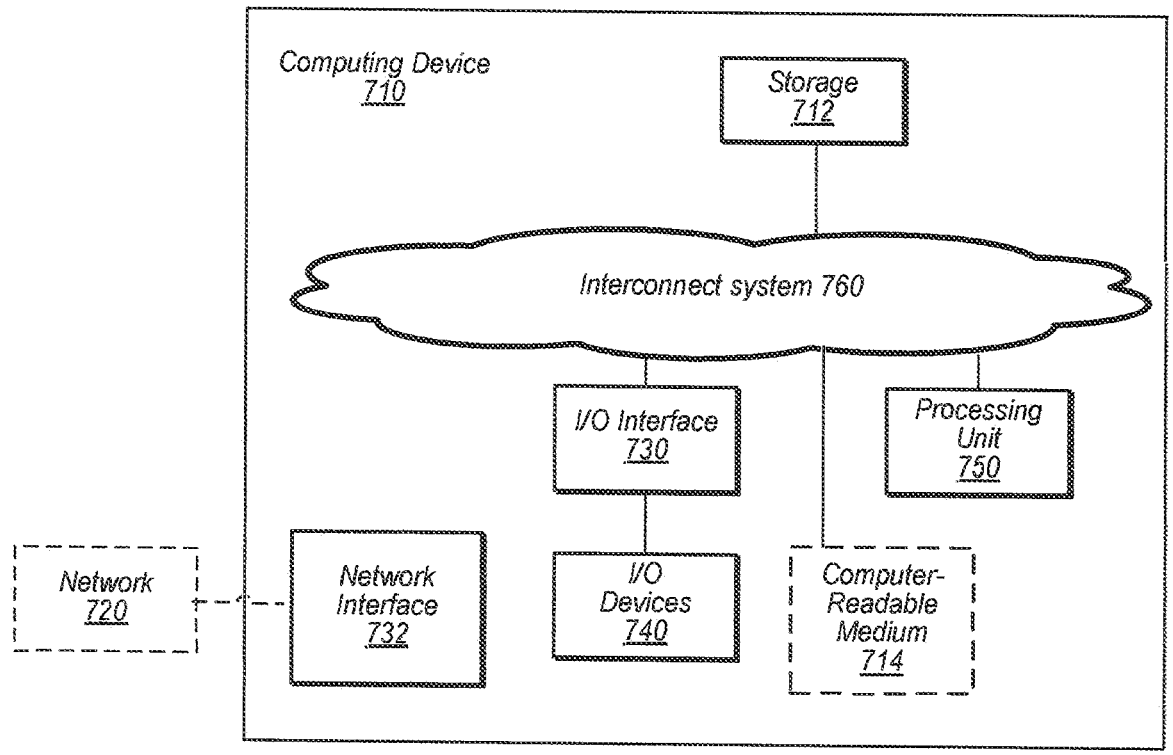
FIG. 7 is a block diagram illustrating an example computing system, according to some embodiments.

Turning now to FIG. 7, a block diagram of one example computing device (which may also be referred to as a computing system) 710 is depicted. Computing device 710 may be used to implement various portions of this disclosure. Computing device 710 may be any suitable type of device, including, but not limited to, a personal computer system, desktop computer, laptop or notebook computer, mainframe computer system, workstation, or network computer. As shown, computing device 710 includes processing unit 750, storage 712, input/output (I/O) interface 730 coupled via an interconnect system 760 (e.g., a system bus or an I/O bus). I/O interface 730 may be coupled to one or more I/O devices 740. Computing device 710 further includes network interface 732, which may be coupled to network 720 for communications with, for example, other computing devices.

In the illustrated embodiment, computing device 710 further includes computer-readable medium 714 as a possibly distinct element from storage subsystem 712. For example, computer-readable medium 714 may include non-transitory, persistent, tangible storage such as tape reels, hard drives, CDs, DVDs, flash memory, optical media, holographic media, or other suitable types of storage. In some embodiments, computer-readable medium 714 may be physically separable from computing device 710 to facilitate transport. In some embodiments, computer-readable medium 714 may be used to manufacture a geophysical data product. For example, in some embodiments, seismic data (generated and recorded according to any one of various disclosed embodiments), or further processed versions of such seismic data, may be stored on computer-readable medium 714, thereby completing manufacture of a geophysical data product. Although shown to be distinct from storage subsystem 712, in some embodiments, computer-readable medium 714 may be integrated within storage subsystem 712.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

As used herein, the terms "processing unit" or "processing element" refer to circuitry configured to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions from any suitable form of non-transitory computer-readable media to perform specified operations.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory in one embodiment. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. These articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

This disclosure includes references to "one embodiment," "a particular embodiment," "some embodiments," "various embodiments," "an embodiment," etc. The appearances of these phrases do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. For example, a "filter configured to process sensor data" is intended to cover, for example, equipment that has a module or circuitry that performs this function during operation, even if the circuitry in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the context clearly dictates otherwise. Furthermore, the words "can" and "may" are used throughout this application in a permissive sense (i.e., having the potential to, being able to), not in a mandatory sense (i.e., must). The term "include," "comprise," and derivations thereof, mean "including, but not limited to." The term "coupled" means directly or indirectly connected.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. When used in the claims, the term "or" is used as an inclusive or and not as an exclusive or. For example, the phrase "at least one of x, y, or z" means any one of x, y, and z, as well as any combination thereof (e.g., x and y, but not z).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. In a technological process for generating an image of subsurface geological features based on recorded seismic data, in which at least one stage of a processing chain includes applying a filter to the seismic data and determining if application of the filter acceptably removed noise from the seismic data while preserving desired signal information present in the seismic data, the specific improvement comprising automating the determining step by causing one or more computer devices to perform actions comprising:
    accessing stored geophysical data;
    filtering at least a first subset of the geophysical data with at least first and second filters corresponding to first and second different filter properties, respectively, the first filter producing a first filter output and the second filter producing a second filter output;

associating a first classification with the first filter output and a second classification with the second filter output;

training a computer-implemented classifier with training data comprising at least the first subset of the geophysical data, the first and second filter outputs, and the first and second classifications;

filtering a second subset of the geophysical data with a third filter to produce a third filter output;

using the trained, computer-implemented classifier to generate a third classification based on the second subset of the geophysical data and the third filter output, wherein at least one of the training and using steps comprises generating at least one similarity attribute that quantifies a degree of similarity between filter output values and difference values, wherein the difference values represent differences between the filter output values and corresponding filter input values; and making a quality control determination, based on the third classification, regarding acceptability of the third filter;

if the third filter is accepted, storing at least one output of the third filter in a noise-attenuated geophysical dataset, otherwise not storing the at least one output of the third filter in the noise-attenuated geophysical dataset, wherein the at least one output of the third filter comprises a result of applying the third filter to at least one subset of the stored geophysical data;

generating an image of a sub-surface feature based on the noise-attenuated geophysical dataset; and storing the image, or data representative thereof, in one or more non-transitory computer-readable media, thereby completing the manufacture of a geophysical data product.

2. The process of claim 1, further comprising:
adjusting one or more parameters of the third filter based on the quality control determination.

3. The process of claim 1, wherein making the quality control determination comprises:
accepting the third filter output if the third classification corresponds to the first classification; and
not accepting the third filter output if the third classification corresponds to the second classification.

4. The process of claim 1, wherein:
the first subset of the geophysical data corresponds to a first collection of seismic traces.

5. The process of claim 1, wherein:
the second subset of the geophysical data corresponds to a second collection of seismic traces.

6. The process of claim 1, wherein the using step further comprises:
determining one or more feature values based on the at least one similarity attribute; and
generating the third classification based on the one or more feature values.

7. The process of claim 1, wherein:
the at least one similarity attribute comprises a cross correlation computed based on the filter output values and the difference values.

8. The process of claim 1, wherein:
the at least one similarity attribute comprises a mean lambda value computed based on the filter input values, the filter output values and the difference values.

9. The process of claim 1, wherein:
the at least one similarity attribute comprises a value of a mutual information function computed based on the filter output values and the difference values.

10. The process of claim 1, wherein:
the at least one similarity attribute comprises a rank correlation computed based on the filter output values and the difference values.

11. The process of claim 1, wherein:
the filter input values correspond to a first collection of seismic traces;
the at least one similarity attribute comprises a vector of plural similarity attribute values; and
further comprising augmenting the vector of plural similarity attribute values with similarity attributes that correspond to a second collection of seismic traces neighboring the first collection of seismic traces.

12. The process of claim 11, wherein:
the first and second collections of seismic traces correspond, respectively, to first and second successive shot gathers.

13. The process of claim 1, wherein:
the first and second subsets of the geophysical data correspond to different subsets of data from a same geophysical survey.

14. One or more non-transitory computer readable media having instructions stored therein that, when executed by one or more processors, cause the one or more processors to perform a quality control method using geophysical data, the method comprising:

filtering at least a first subset of the geophysical data with at least first and second filters corresponding to first and second different filter properties, respectively, the first filter producing a first filter output and the second filter producing a second filter output;

associating a first classification with the first filter output and a second classification with the second filter output;

training a computer-implemented classifier with training data comprising at least the first subset of the geophysical data, the first and second filter outputs, and the first and second classifications;

filtering a second subset of the geophysical data with a third filter to produce a third filter output;

using the trained, computer-implemented classifier to generate a third classification based on the second subset of the geophysical data and the third filter output, wherein at least one of the training and using steps comprises generating at least one similarity attribute that quantifies a degree of similarity between filter output values and difference values, wherein the difference values represent differences between the filter output values and corresponding filter input values;

making a quality control determination based on the third classification; and if the third filter is accepted, storing at least one output of the third filter in a noise-attenuated geophysical dataset, otherwise not storing the at least one output of the third filter in the noise-attenuated geophysical dataset, wherein the at least one output of the third filter comprises a result of applying the third filter to at least one subset of the stored geophysical data; and generating an image of a sub-surface feature based on the noise-attenuated geophysical dataset.

15. The media of claim 14, wherein the method further comprises:
adjusting one or more parameters of the third filter based on the quality control determination.

16. The media of claim 14, wherein making the quality control determination comprises:
accepting the third filter output if the third classification corresponds to the first classification; and not accepting the third filter output if the third classification corresponds to the second classification.

17. The media of claim 14, wherein:
the first and second subsets of the geophysical data correspond, respectively, to first and second collections of seismic traces.

18. The media of claim 14, wherein the using step further comprises:
determining one or more feature values based on the at least one similarity attribute; and
generating the third classification based on the one or more feature values.

19. The media of claim 14, wherein:
the filter input values correspond to a first collection of seismic traces;
the at least one similarity attribute comprises a vector of plural similarity attribute values; and
further comprising augmenting the vector of plural similarity attribute values with similarity attributes that correspond to a second collection of seismic traces neighboring the first collection of seismic traces.

20. The media of claim 19, wherein:
the first and second collections of seismic traces correspond, respectively, to first and second successive shot gathers.

21. A system for automating filtration quality determinations in a processing chain that generates an image of subsurface geological features based on recorded geophysical data, comprising:
one or more non-transitory computer readable media having at least a subset of the geophysical data stored thereon;
a filter;
an attribute determination module configured to generate at least one similarity attribute that quantifies a degree of similarity between filter output values and difference values, wherein the difference values represent differences between the filter output values and corresponding filter input values; and
a trained classifier configured to classify, based at least in part on an output of the attribute determination module, results of applying the filter to at least the subset of the geophysical data;
wherein the system is configured to store at least one output of the filter in a noise-attenuated geophysical dataset if the filter is accepted by the classifier, otherwise not to store the at least one output of the filter in the noise-attenuated geophysical dataset, wherein the at least one output of the filter comprises a result of applying the filter to at least one subset of the stored geophysical data; and
an image generation module configured to generate an image of a sub-surface feature based on the noise-attenuated geophysical dataset.

22. The system of claim 21:
further comprising a training module configured to train the classifier using at least the attribute determination module and a set of training data;
wherein the set of training data comprises:
at least a first result corresponding to an application of a first filter to a training subset of the geophysical data;
a first classification associated with the first result;
at least a second result corresponding to an application of a second filter to the training subset of the geophysical data, wherein the second filter exhibits different filter parameters than the first filter; and
a second classification associated with the second result.

23. The system of claim 22:
further comprising a feature extraction module configured to extract features from the output of the attribute determination module; and
wherein the classifier is configured to generate a classification based on the features extracted by the feature extraction module.

24. The system of claim 23, wherein:
the feature extraction module is configured to extract the features based on at least one of a principle component analysis or an independent component analysis.

25. The system of claim 21, wherein:
at least one of the filter, the attribute determination module, and the trained classifier is implemented by one or more computing devices executing program instructions stored in at least one computer-readable memory accessible by the one or more computing devices.

* * * * *